(12) United States Patent
Modreski et al.

(10) Patent No.: US 6,843,520 B1
(45) Date of Patent: Jan. 18, 2005

(54) REAR JUMP SEAT HEAD RESTRAINT MOUNTING SLEEVE

(75) Inventors: Michael P. Modreski, Rochester Hills, MI (US); Flores B. Luis, Rochester Mills, MI (US); Brian Begg, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/707,581

(22) Filed: Dec. 22, 2003

(51) Int. Cl.[7] ............................................... B60R 21/02
(52) U.S. Cl. ........................................ 296/63; 297/395
(58) Field of Search ........................... 296/63; 297/391, 297/395, 216.12

(56) References Cited

U.S. PATENT DOCUMENTS

| | | | | |
|---|---|---|---|---|
| 3,762,505 A | * | 10/1973 | Morse | 188/371 |
| 3,922,029 A | * | 11/1975 | Urai | 296/68.1 |
| 4,249,754 A | * | 2/1981 | Best | 280/751 |
| 4,725,076 A | * | 2/1988 | Taylor | 280/808 |
| 6,109,689 A | * | 8/2000 | Nanni | 297/216.1 |
| 6,419,322 B2 | | 7/2002 | Nakane et al. | 297/408 |
| 6,447,068 B1 | | 9/2002 | Anderson et al. | 297/408 |
| 6,508,512 B2 | | 1/2003 | Saberan et al. | 297/408 |
| 6,523,902 B2 | | 2/2003 | Robinson | 297/410 |
| 6,527,344 B2 | | 3/2003 | Takei | 297/391 |

* cited by examiner

Primary Examiner—Joseph D. Pape
(74) Attorney, Agent, or Firm—Bill C. Panagos

(57) ABSTRACT

Disclosed is a rear jump seat head restraint mounting sleeve providing an easy and economic manner of mounting a rear jump seat head restraint by its top edge to a truck roof header.

10 Claims, 4 Drawing Sheets

REAR JUMP SEAT HEAD RESTRAINT MOUNTING SLEEVE

BACKGROUND OF INVENTION

1. Field of the Invention

The present invention generally relates to a head restraint mounting sleeve for use with an automotive seat. More particularly, the invention is directed to a head restraint mounting sleeve for jump seats commonly found in the rear portion of extended cab trucks and some SUVs, wherein the head restraint is mounted to the vehicles roof header as well as to the jump seat fascia.

2. Description of the Related Art

There exist a number of vehicular head restraints mounted to passenger seats for use in vehicles for providing passenger head restraint. Well known conventional head restraints includes a padded head restraint body covered with a flexible upholstery material and extend above the back support region of a seat with the head restraint typically attached directly to the seat. It is also well known to utilize head restraints with sliding connector rods that allow the head restraint to be adjusted and/or removed from the seat. However, there are a number of seating types that do not currently have head restraints provided, including jump seats utilized in SUVs and extended cab trucks. The proposed FMVSS 202 requirement requires head restraints for all passenger seats. Known head restraint mounting systems do not work with many jump seat configurations due to the lack of solid support for the head restraint mounting in the jump seat fascia.

Examples of known seat back mounted head restraints include for example, U.S. Pat. No. 6,527,344 issued Mar. 4, 2003 to Takei teaches an improved method of forming a conventional moveable head restraint to be mounted on the top of a seat back.

U.S. Pat. No. 6,523,902 issued Feb. 25, 2003 teaches another form of a conventional head rest mounted on a seat back.

U.S. Pat. No. 6,508,512 issued Jan. 21, 2003 teaches a hinged head restraint to allow for easier seat installation during assembly of the vehicle. The head restraint is mounted on the top of the seat back as is conventionally known.

U.S. Pat. No. 6,447,068 issued Sep. 10, 2002 teaches a pop-up head restraint for mounting in a seat back to allow for increased driver rearview vision when the passenger seat with said pop-up head restraint is in the down position is not occupied.

U.S. Pat. No. 6,419,322 issued Jul. 16, 2002 to Nakane et al. teaches a conventionally seat back mounted head restraint having a movable bottom portion.

U.S. Pat. No. 4,951,998 issued Aug. 28, 1990 to McClain teaches an auxiliary head restraint detachable pillow system for supporting a passengers head while seated in a automotive vehicle.

DISCLOSURE OF THE INVENTION

The present invention provides advantages and alternatives over the prior art by providing a means of attaching a head restraint to the rear jump seat area of an automotive vehicle.

According to a further aspect of the present invention, there is provided a rear jump seat head restraint mounting sleeve for mounting a rear jump seat head restraint to the roof header of a truck comprising: a cylinder having a proximal end and a distal end, said proximal end having an integrally formed flange having an outside diameter larger than the outside diameter of said cylinder at a desired angle to the longitudinal centerline of said cylinder, said distal end having a integrally formed head having a desired diameter larger than the diameter of said cylinder and smaller than the diameter of said flange, and having a proximal end and a distal end, said distal end having a pair of opposed slots therein extending a desired distance toward the proximal end effectively dividing the distal end of said cylinder into two substantially equal portions and further having a positioning tab along one edge of each of said opposed slots; a pair of locking tabs each locking tab located substantially 90 degrees from each of said pair of opposed slots; and said cylinder having a pair of ribs on the inside surface parallel to the longitudinal axis thereof, said cylinder further having an inside diameter suitable to accept an upper head restraint mounting post.

The present invention thus advantageously provides a means of securely attaching a head restraint for use by occupants of the rear jump seat found in many automotive vehicles.

DETAILED DESCRIPTION

Figure 1:
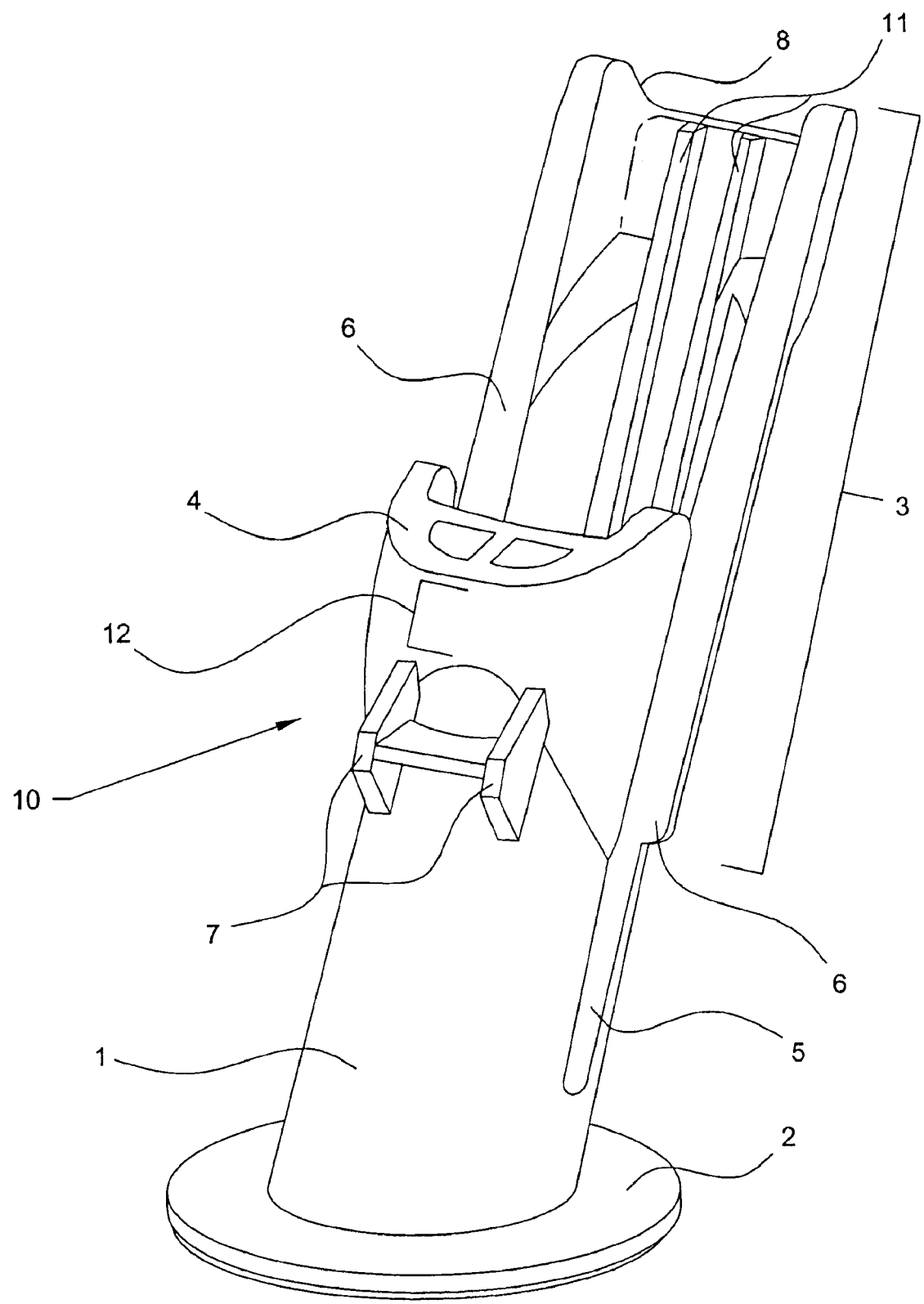
FIG. 1 shows a perspective view of one angle of the jump seat head restraint mounting sleeve of the present invention.

Reference will now be made to the drawings, wherein to the extent possible like reference numerals are utilized to designate like components throughout the various views. Referring to FIG. 1, which presents a perspective view of the jump seat head restraint mounting sleeve 10 comprising a cylinder 1 having a proximal or lower end and a distal or upper end, said proximal end having an integrally formed decorative closeout flange 2 having an outside diameter larger than the outside diameter of said cylinder at a desired acute angle to the longitudinal centerline of said cylinder 1, and said distal end having a integrally formed head area 3 having a desired diameter larger than the diameter of said cylinder 1 and smaller than the diameter of said decorative closeout flange 2. The head area 3 has a proximal or lower end, and a distal or upper end, said distal end having lead-ins 4 and 8 for ease of assembly of mounting sleeve 10 through the headliner and into the vehicle sheet metal. Said cylinder 1 having an inside diameter sized to accept an upper head restraint mounting post 31 (FIGS. 3–4) and further having a pair of ribs 11 located vertically therein. Said ribs 11 have a lead-in on their ends to aid in the installation of the upper post on the head restraint. Said ribs 11 further designed to crush upon installation of the upper post on the head restraint to ensure a tight rigid fit of the head restraint without buzz, squeak, or rattle (BSR).

As further shown in FIG. 1 the cylinder 1 at the distal end has a pair of slots 5, located substantially 180 degrees from one another, cut in the wall of cylinder 1 for a desired distance toward the proximal or lower end of said cylinder 1 and having a slot width which allows said cylinder to be compressed to an outside diameter small enough to pass through the truck frame header (not shown) during mounting of said jump seat head restraint mounting assembly 1 in said truck header, and to expand and lock into the vehicle header sheet metal upon insertion of the upper post of the head restraint. Also shown is a pair of positioning tabs 6, each such tab being located along the same edge of each of said slots 5.

Also shown in FIG. 1 is a pair of locking tabs 7 which seat and lock said jump seat head restraint mounting sleeve in proper position, preventing over travel and insuring proper location of the head restraint mounting sleeve 10. Also shown is load bearing area 12 that in combination with the top surface of locking tabs 7 engages against the vehicle sheet metal to distribute the impact load potentially sustained by the head restraint into the vehicle body and retention feature to lock into the sheet metal.

Figure 2:
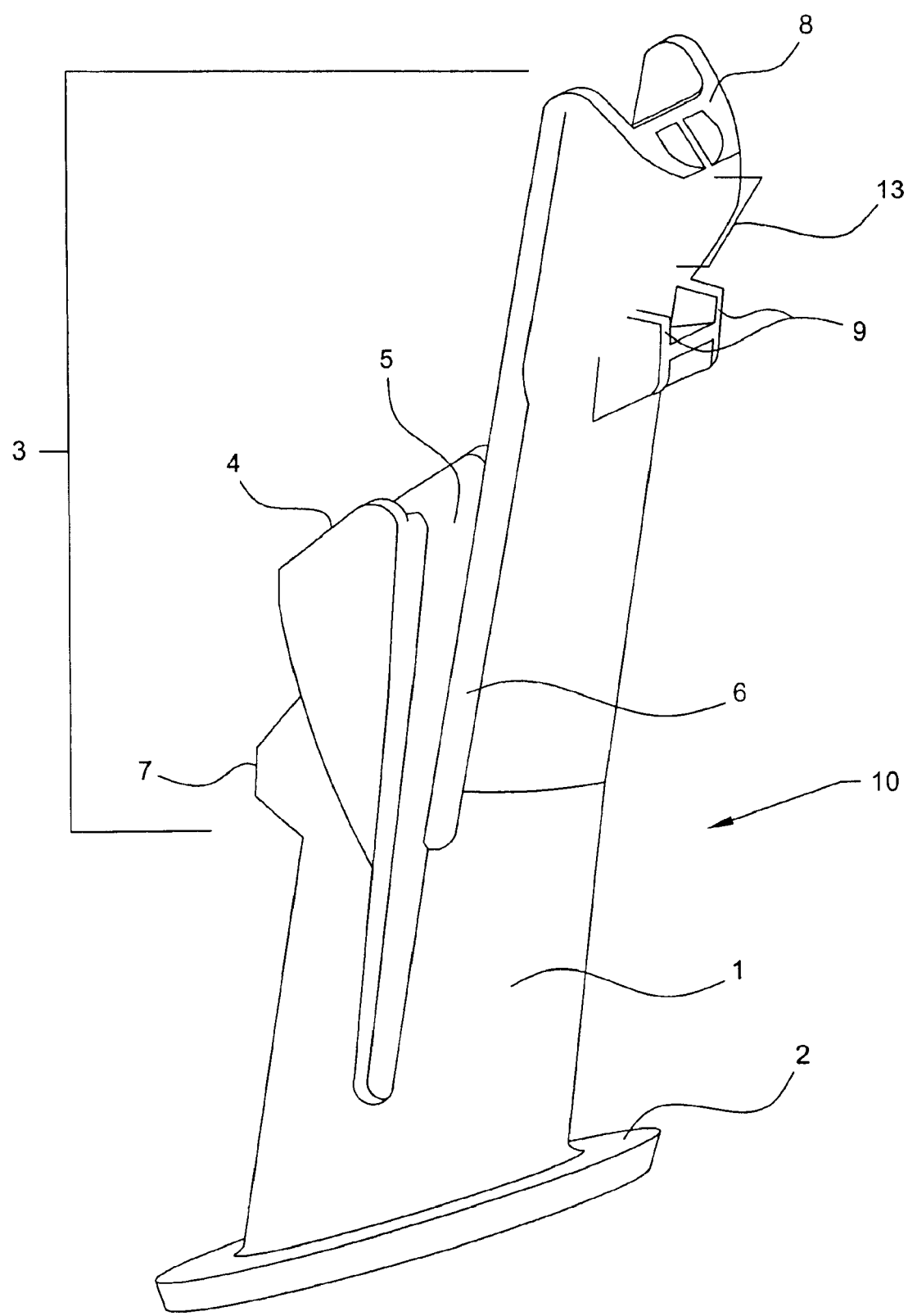
FIG. 2 shows a perspective view of the jump seat head restraint mounting sleeve of the present invention 180 degrees opposed to the view of FIG. 1.

Referring now to FIG. 2, there is shown the jump seat head restraint mounting sleeve 10 viewed from an angle approximately 90 degrees clockwise to the view in FIG. 1 and showing said cylinder 1 having said decorative closeout flange 2 on its proximal or lower end, and said head area 3 at is distal or upper end. One positioning tab 6 is shown along one edge of one of corresponding slots 5. Also shown is load bearing area 13 that in combination with the top surface of locking tabs 9 engages against the vehicle sheet metal to distribute the impact load potentially sustained by the head restraint into the vehicle body and retention feature to lock into the sheet metal.

Also shown in FIG. 2 is a second lead-in 8 substantially 180 degrees from lead-in 4 in the distal or upper end of head area 3, a pair of locking tabs 7 and a pair of locking tabs 9 which seat and lock said jump seat head restraint mounting sleeve in proper position, preventing over travel and insuring proper location of the head restraint mounting sleeve 10.

Figure 3:
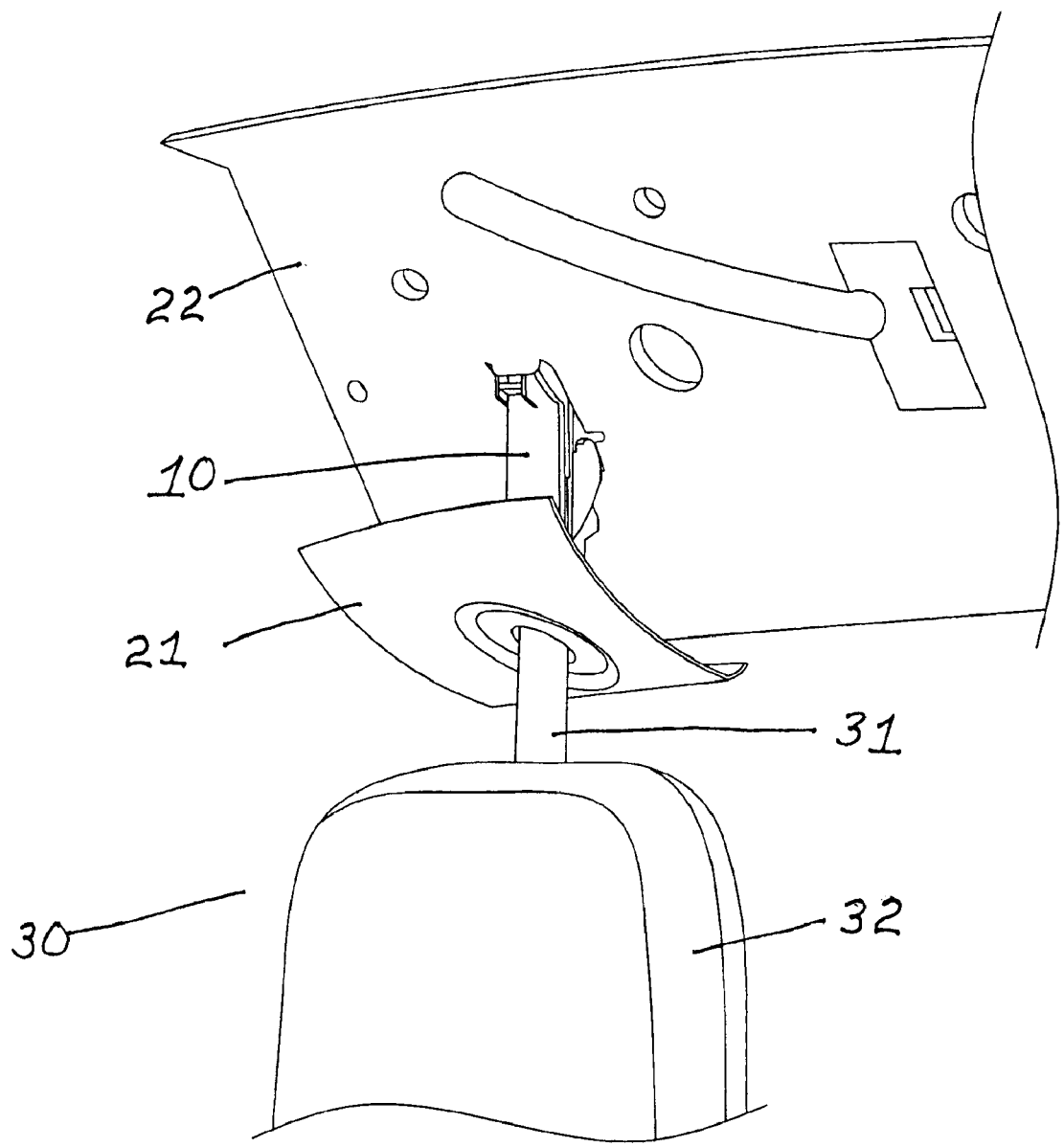
FIG. 3 shows a front perspective view of one embodiment of a jump seat head restraint mounted using the jump seat head restraint mounting sleeve of the present invention.
Figure 4:
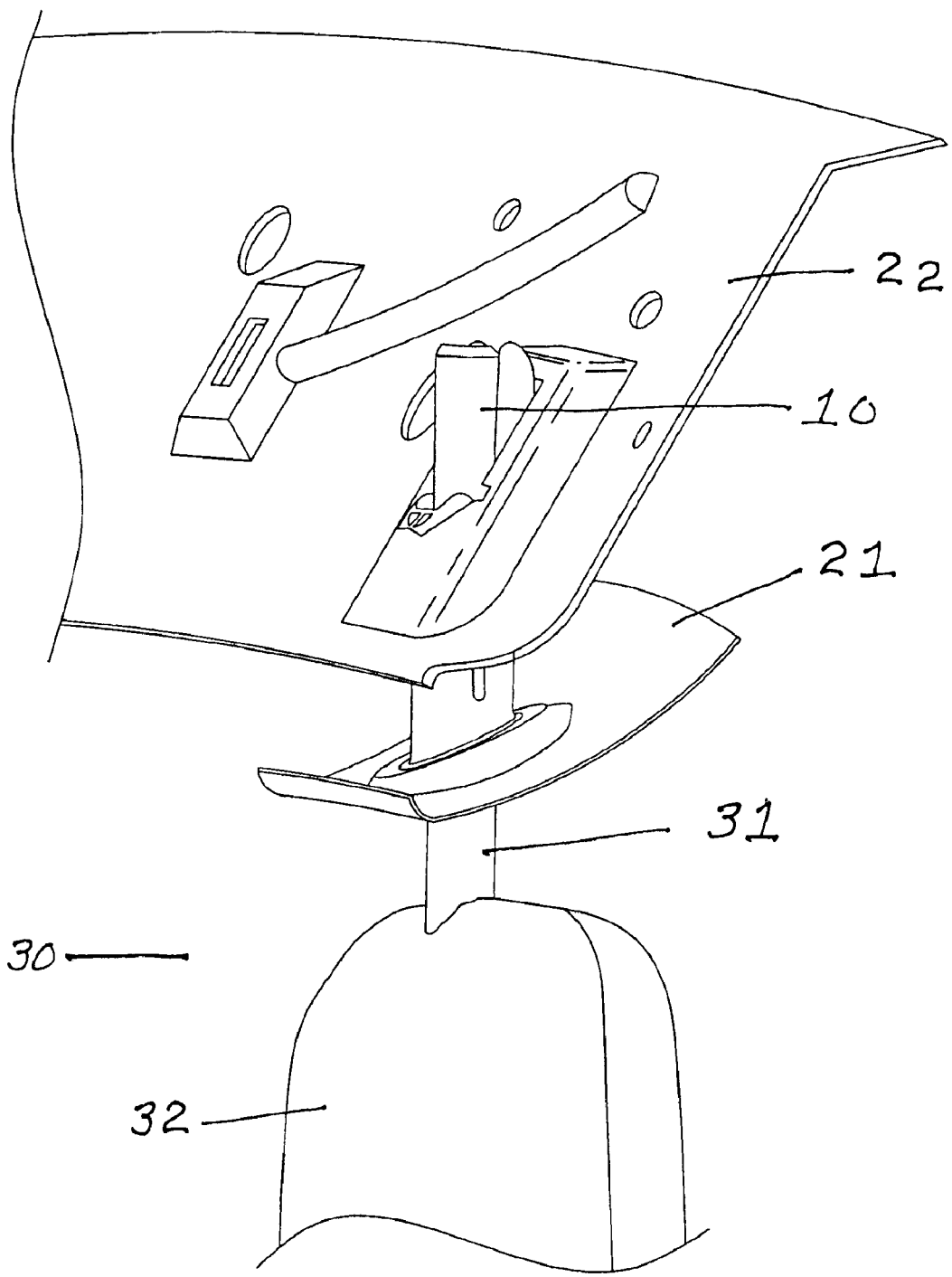
FIG. 4 shows a back perspective view of one embodiment of a jump seat head restraint mounted using the jump seat head restraint mounting sleeve of the present invention.

Turning now to FIG. 3, there is shown one embodiment of the present invention 10 mounted through a truck headliner 21 into a truck roof header 22 and having mounted therein an upper head restraint mounting post 31. Also shown is a partial view of a head restraint assembly 30 showing said upper head restraint mounting post 31, and a head restraint cushion 32. The head restraint assembly 30 is mounted to the truck roof header by means of the jump seat head restraint mounting sleeve FIG. 4 shows the embodiment of the present invention 10 mounted through a truck headliner 21 into a truck roof header 22 as shown in FIG. 2 from a viewpoint above and behind the rear jump seat head restraint assembly 30 having a restraint mounting post 31 mounted to said truck roof header the sleeve 10. Also shown is a partial view of head restraint 32.

While the preferred embodiments of the present invention disclose pairs of locking taps 7, 9 it is to be understood that the locking tabs 7, 9 may be single units or have more than two locking tabs on each side of the sleeve. The pair of ribs 11 overall ID within the body of the mounting sleeve 10 to the head restraint rod OD is selected to ensure the head restraint is tight as well as the locking features 7, 9, 12, and 13 into the sheet metal to ensure a tight, secure fit with no movement when installed. Likewise, the dimensions of the various portions of the mounting sleeve are selected to ensure a tight secure fit without buzz, squeak, or rattle (BSR). Similarly, the lead-ins are designed to provide easy assembly of the mounting sleeve into the vehicle headliner and sheet metal while providing a tight secure BSR-free fit.

Suitable materials for the rear jump seat head restraint sleeve 10 of the present invention include, for example, polypropylene, impact polypropylene, talc filled polypropylene, ABS, polycarbonate/ABS, and nylon 6/6. The manner of making said rear jump seat head restraint sleeve is by any well known means, presently preferred is making by injection molding.

In practice in a truck with jump seats in which a headliner 21 has been mounted the headliner 21 has a bore therein corresponding to a mounting bore in the truck roof header sheet metal 22. The rear jump seat head restraint sleeve 10 is pushed through the bore in the headliner 21 and into the corresponding bore in the truck roof header sheet metal 22 with enough force to cause the head area 3 of sleeve 10 to be compressed and is forced through said bore in said truck roof header sheet metal 22 after passing through a corresponding bore in truck headliner 21 until said sleeve 10 is seated by locking tabs 7 and 9. The flange 2 holding the headliner in position and providing a trim function on the interior passenger compartment side of said headliner. The upper head restraint mounting post 31 is then inserted into the sleeve 10 locking the mounting sleeve 10 into the sheet metal. The bottom of the head restraint 30 is then to the vehicle in known manner. This creates a rigid head restraint system that meets government requirements while providing a head restraint for the occupant of a jump-style seat in a vehicle where may be no seat back.

Although the preferred embodiments of the present invention has been disclosed, various changes and modifications may be made without departing from the scope of the invention as set forth in the appended claims.

What is claimed is:

1. A rear jump seat head restraint mounting sleeve for mounting a rear jump seat head restraint to the roof header of a truck comprising:

a cylinder having a proximal end and a distal end, said proximal end having an integrally formed flange having an outside diameter larger than the outside diameter of said cylinder at a desired angle to the longitudinal centerline of said cylinder, said distal end having an integrally formed head having a desired diameter larger than the diameter of said cylinder and smaller than the diameter of said flange, and having a proximal end and a distal end, said distal end having a pair of opposed slots therein extending a desired distance toward the proximal end effectively dividing the distal end of said cylinder into two substantially equal portions and further having a positioning tab along one edge of each of said opposed slots;

a pair of locking tabs, each locking tab located substantially 90 degrees from each of said pair of opposed slots; and said cylinder having a pair of ribs on the inside surface parallel to the longitudinal axis thereof, said cylinder further having an inside diameter suitable to accept an upper head restraint mounting post.

2. The rear jump seat head restraint mounting sleeve as claimed in claim 1 wherein, said assembly is composed of a plastic.

3. The rear jump seat head restraint mounting sleeve as claimed in claim 1 wherein, said assembly is formed by a plastic molding means.

4. The rear jump seat head restraint mounting sleeve as claimed in claim 2 wherein, said plastic is selected from the group comprising polypropylene, impact polypropylene, talc filled polypropylene, ABS, polycarbonate/ABS, and nylon 6/6.

5. The rear jump seat head restraint mounting sleeve as claimed in claim 3 wherein, said plastic molding means comprises injection molding.

6. The rear jump seat head restraint mounting sleeve as claimed in claim 1 wherein, said locking tabs comprise single tabs.

7. The rear jump seat head restraint mounting sleeve as claimed in claim 1 wherein, said locking tabs comprise pairs of tabs.

8. The rear jump seat head restraint mounting sleeve as claimed in claim 1 wherein, said distal end provides a lead-in for ease of mounting said mounting sleeve.

9. The rear jump seat head restraint mounting sleeve as claimed in claim 1 wherein, said cylinder has an average wall thickness of about 2.5 mm.

10. The rear jump seat head restraint mounting sleeve as claimed in claim 1 wherein, said flange provides a decorative closeout.

* * * * *